July 2, 1946.                L. D. MARTIN                2,403,008
                        GEAR TESTING WORK HOLDER
                         Filed July 13, 1944

LOUIS D. MARTIN
    INVENTOR
BY
    ATTORNEYS

Patented July 2, 1946

2,403,008

UNITED STATES PATENT OFFICE 2,403,008

GEAR TESTING WORK HOLDER

Louis D. Martin, Rochester, N. Y., assignor to Eastman Kodak Company, Rochester, N. Y., a corporation of New Jersey Application July 13, 1944, Serial No. 544,747

4 Claims. (Cl. 33—179.5)

This application relates to a work holder design for holding spur gears in a position to be tested in a gear testing machine. One of the objects of my invention is to provide a work holder by which spur gears may be accurately held upon a support on which they may be rotated. Another object of my invention is to provide a work holder of the class described which can be accurately located on a gear testing machine and which will accurately support a gear in the proper relationship thereto. Another object of my invention is to provide a work holder with a means for loading and unloading gears to be tested rapidly while the holder is still mounted on the gear testing machine. Other objects will appear from the following specification, the novel features being particularly pointed out in the claims at the end thereof.

I have shown two different types of gear testing machines in my copending applications: Serial No. 478,044, filed March 4, 1943, now Patent 2,369,417, granted February 13, 1945; Serial No. 544,746, for Spur gear testing machines, filed July 13, 1944; and in my Patent No. 2,350,788, I have illustrated a preferred form of master worm section which may be used for testing gear teeth to determine both the accumulated error in the gear teeth as well as to determine the accuracy of any tooth and the pitch diameter.

The present work holder is especially designed for a gear testing machine of the type shown in my second-mentioned application referred to above. Since my present invention is particularly directed to work holders for properly positioning small gears having fine teeth, I have provided a holder which can be fixedly attached to the gear testing machine and which is provided with a means for accurately positioning gears relative to the machine. Such gears may have only a central opening to support a shaft or may have one or two trunnions extending from the gears so that it is usually necessary to provide a specific work holder for the type of gear to be tested. Such holders are intended for use in the production testing of gears wherein extreme accuracy is required.

Coming now to the drawing wherein like reference characters denote like parts throughout:

Figure 1:
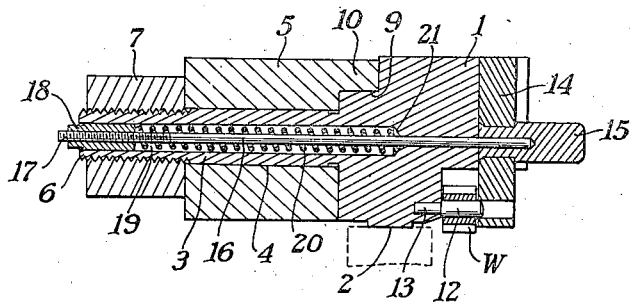
Fig. 1 is a sectional view through a pinion holding work holder constructed in accordance with and embodying a preferred form of my invention.
Figure 2:
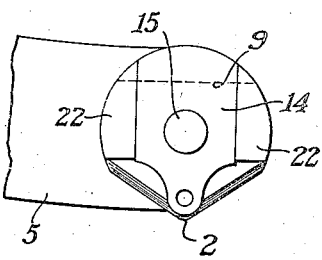
Fig. 2 is an end elevation of the holder shown in Fig. 1 showing it mounted on a hinged arm which forms a part of a gear testing machine as shown in my second-mentioned copending application.

My improved work holder consists broadly in a device carrying an accurately-formed pad having a definite relationship to the pitch diameter of the gear to be tested. I prefer to form this pad at exactly the pitch diameter of a theoretically perfect gear to which the gear to be tested is made to conform as closely as possible. The work holder is provided with a means for accurately locating it upon the gear testing machine arm and with a means which will accurately and rotatively support a gear to be tested in the correct relationship with the accurately-formed pitch diameter pad.

More specifically, the work holder shown in the first three figures may consist of a support 1 which consists of a block of metal of any desired shape on which an accurately-formed pad 2, here shown as being equal to the pitch diameter of a theoretically perfect gear of the size to which a work piece gear W is made to conform as nearly as possible. The support 1 has a cylindrical extension 3 adapted to pass through an aperture 4 in an arm 5 of a gear testing machine, the end 6 of the tubular extension 4 being threaded so that it may be fastened in place by means of a nut 7 which is preferably knurled as indicated at 8 in Fig. 4 for convenience.

Figure 4:
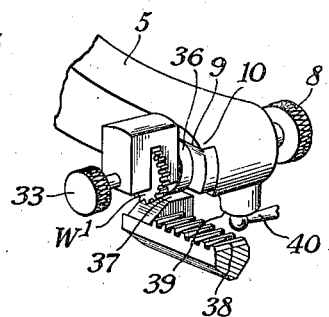
Fig. 4 is a fragmentary perspective view showing a second embodiment of my invention.

The supporting block 1 is provided with a shoulder 9 which is adapted to engage a complemental shoulder 10 as shown in Fig. 4 of the arm 5 so as to locate the block accurately in position.

Figure 3:
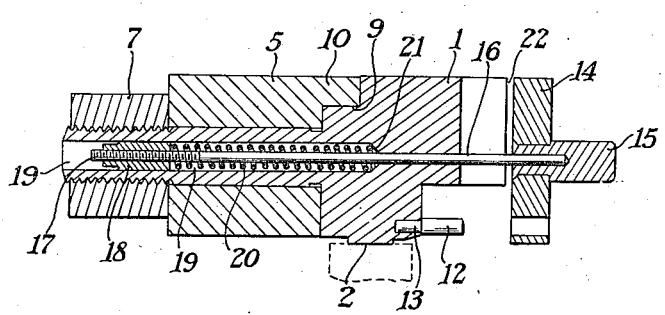
Fig. 3 is a view similar to Fig. 1, but with the parts drawn out to release a gear held by the work holder.

The work gear W may be held in place by means of a trunnion 12 having a shank 13 supported by the block 1 and may be moved to and from the trunnion 12 when the pad 14 is moved outwardly into the Fig. 3 position by means of a handle 15. The handle 15 is attached to a rod 16 threaded at 17 to receive a nut 18. This nut slides freely in an aperture 19 in the tubular extension 3. A spring 20 may be compressed between the nut and the shoulder 21 so that the handle 15 is drawn out against the pressure of spring 20. By turning the block 14 through a small angle after it has been drawn out, it can be made to rest on the shoulders 22 while the work piece W is being loaded or removed from the trunnion 12. Thus it is an extremely simple matter to load and unload the work gear W to be tested and this operation can be performed accurately with very little effort on the part of an operator.

Figure 5:
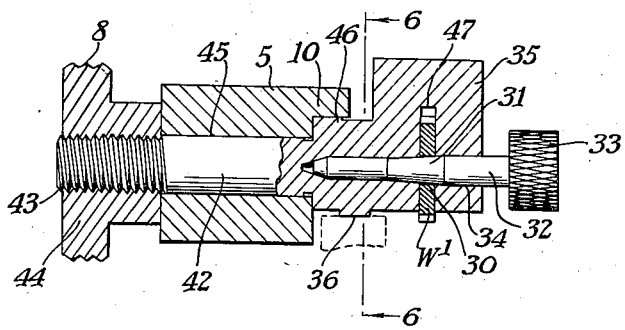
Fig. 5 is a view similar to Figs. 1 and 3, this figure being the embodiment of my invention shown in Fig. 4.
Figure 6:
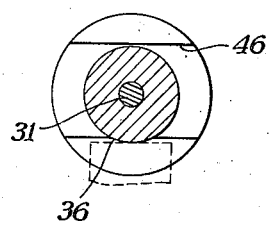
Fig. 6 is a section taken on line 6—6 of Fig. 5.

In the second form of my embodiment illustrated in Figs. 4–6, inclusive, a work gear W¹ is provided with an aperture 30 as shown in Fig. 5, this aperture being engaged by a tapered section 31 on a removable pin 32 carried by the knob 33. This pin is insertable through a bore 34 in the block 35 to hold the work gear W¹ in the position shown for testing. In this instance the block 35 is provided with a cylindrical pad 36 bearing a definite relation to the pitch diameter which the gear to be tested should have. I prefer to have this pad on the pitch diameter but it may, nevertheless, vary therefrom by a predetermined extent because in testing gears the pad 36 will be brought into contact with a pad 37 of a gear testing tool, the teeth of which 38 are in the form of a worm section as described in my above-mentioned patent. Thus, the pitch diameter pad may be contacted with the pad 37 as indicated in Fig. 4 to determine the initial position of the arm 5, this arm having a pad 39 engaging a feeler arm 40 of a micrometer. After setting the micrometer to zero, as explained in my second-mentioned application, the teeth of the work gear W¹ are meshed with the teeth 38 and any deviation from the proper shape will be registered on the micrometer gauge.

Returning to the work holder of Figs. 4–6 it will be noted that the supporting block 35 carries a shaft 42 threaded at 43 to receive a nut 44 which holds the shaft in place on the gear testing machine arm 5, the shaft 42 passing through a suitable bore 45 in the arm.

As with the first-described embodiment of my work holder, it is provided that a shoulder 46 having a flat upper surface adapted to contact with and be located by the complemental shoulder 10 on the gear testing machine arm 5.

The block 35 is slotted at 47 to receive the work gear W¹ to be tested so that in this instance the operation of loading and unloading the test gears merely requires the removal and insertion of the plug 32 by means of the handle 33.

The operation of both the embodiments of my work holder is extremely similar in that, when a gear to be tested requires a holder, the particular fixture for positioning the work gear must be designed to the shape of the gear. However, the holders both have a main block for supporting the work gear to be tested, a means for rapidly attaching and detaching gears from the block, an accurately formed pad representing the pitch diameter which the gear to be tested should have, and a means for attaching the work holder in a fixed position accurately upon the arm of a gear testing machine. In both forms of my invention the gear to be tested may be inserted and removed while the work holder is fixedly attached to the gear testing machine.

Assuming the gear W is to be tested, the work holder shown in the first three figures is attached to the arm 5 by passing the shaft 3 through the aperture 4 and turning the nut 7 on the thread until the locating shoulders 9 and 10 mate and definitely hold the work holder in the correct position.

It is then only necessary to insert a gear W on the trunnion 12 while the handle 15 is held outwardly against the pressure of spring 20 and to permit the spring 20 to draw in the part 14 until it engages the gear W as indicated in Fig. 1. The gear may then be tested and removed by reversing the above-described movement in so far as withdrawing the handle 15 to the Fig. 3 position is concerned. Usually, with a single setup a large number of gears will be tested so that these successive operations can take place quite rapidly, since in testing each gear the operator will merely lower the arm 5 until the pad 2 rests on the pad 37 of the master worm section so as to position the feeler arm 40. With the gauge operated by the feeler arm 40 set to zero the teeth of the work piece are meshed with the teeth of the worm section 38 and by noting the deflection of the gauge, which I prefer to graduate into units of ten thousandths of an inch, the inaccuracy of the teeth may be determined. Thus, a gear held by my work holder can be quickly and accurately tested for pitch diameter and for accumulated error in the teeth. If it is desired to test individual tooth shape, the testing block may be provided with a single tooth spaced from the series of teeth so that either the single tooth may be used for testing the individual tooth shape or the plurality of teeth may be used for testing all of the teeth by moving the master worm section a distance sufficient to rotate the gear being tested at least one revolution.

With the gear holder shown in the last three figures, the operation is exactly the same as that above described except that the work piece W¹ is loaded and removed from a slot 47 and is held in place by the tapered pin 31 operative through the handle 33. It will be obvious that the specific form of gear supporting device will have to be altered to accommodate the particular work piece to be tested. If the gears should have trunnions attached, only bearing members would be provided on the fixed part of the work block and the movable member attached to the work block. Such modifications will readily suggest themselves to those skilled in the art.

I claim:

1. A work holder for gear testing machines comprising a slotted support, bearings extending transversely of the slot, a trunnion extending through the bearings and adapted to rotatably carry a gear to be tested and mounted in the slot, a pad on the support having a definite relationship to the pitch diameter of the gear to be tested and means for attaching the support to a gear testing machine.

2. A work holder for gear testing machines comprising a support, means for rotatably attaching a gear to be tested to said support, a pad formed on the support having a predetermined relationship to the pitch diameter of the gear to be supported thereby, said means for rotatably attaching a gear to the support including said support and a part movable relative thereto, said part movable relative thereto holding said gear to be tested when moved into an operative position, and a spring tending to move the part movable relative thereto into its operative gear holding position.

3. A work holder for gear testing machines comprising a support, means for rotatably attaching a gear to be tested to said support, a pad formed on the support having a predetermined relationship to the pitch diameter of the gear to be supported thereby, said means for rotatably attaching a gear to the support including said support and part movable relative thereto, said part movable relative thereto holding said gear to be tested when moved into an operative position, and a spring tending to move the part movable relative thereto into its operative gear holding position, a rod supporting said part movable relative thereto for slidably mounting said last-mentioned part on said support.

4. A work holder for gear testing machines and comprising a support, means for mounting a gear thereon including a movable part mounted on the support, a bearing on the support and a second bearing on the movable part, means for axially aligning the two bearings, and an accurately formed pad carried by the work holder in a predetermined relationship to the axially aligned bearings.

LOUIS D. MARTIN.